(12) United States Patent
Park et al.

(10) Patent No.: US 9,201,569 B2
(45) Date of Patent: Dec. 1, 2015

(54) METHOD AND RECORDED MEDIUM FOR PROVIDING 3D INFORMATION SERVICE

(71) Applicant: Alticast Corporation, Seoul (KR)

(72) Inventors: Jae Hwan Park, Seoul (KR); Woo Jung Choi, Seoul (KR)

(73) Assignee: Alticast Corporation, Seoul (KR)

( * ) Notice: Subject to any disclaimer, the term of this patent is extended or adjusted under 35 U.S.C. 154(b) by 164 days.

(21) Appl. No.: 13/730,057

(22) Filed: Dec. 28, 2012

(65) Prior Publication Data

US 2013/0174098 A1    Jul. 4, 2013

(30) Foreign Application Priority Data

Dec. 29, 2011 (KR) .......................... 10-2011-0145903

(51) Int. Cl.
| | |
|---|---|
| *G06F 3/0481* | (2013.01) |
| *G06F 3/0482* | (2013.01) |
| *G06F 3/0483* | (2013.01) |
| *G06T 19/20* | (2011.01) |
| *G06T 11/20* | (2006.01) |
| *H04N 13/00* | (2006.01) |
| *H04N 13/02* | (2006.01) |

(52) U.S. Cl.
CPC .......... *G06F 3/04815* (2013.01); *G06T 11/206* (2013.01); *G06T 19/20* (2013.01); *H04N 13/007* (2013.01); *H04N 13/026* (2013.01); *G06F 2203/04802* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 6,466,237 B1* | 10/2002 | Miyao et al. ................... | 715/838 |
| 2005/0022133 A1* | 1/2005 | Sakamoto et al. ............ | 715/760 |
| 2006/0020888 A1* | 1/2006 | Kang et al. .................... | 715/708 |
| 2010/0223004 A1* | 9/2010 | Kondo ........................... | 701/201 |
| 2012/0260217 A1* | 10/2012 | Celebisoy ...................... | 715/836 |

* cited by examiner

*Primary Examiner* — Matt Kim
*Assistant Examiner* — Daniel Samwel
(74) *Attorney, Agent, or Firm* — Mintz Levin Cohn Ferris Glovsky and Popeo, P.C.; Kongsik Kim; Derek E. Constantine

(57) ABSTRACT

A method of providing a 3D information service at a user terminal includes: receiving a first request of a user for displaying information; and displaying information elements, which have different depths along the Z axis orthogonal to a screen (XY plane), by rotating the information elements about any one of the X axis and the Y axis, where the rotational axis of each of the information elements is set at different points on the YZ plane or the XZ plane. According to certain embodiments of the invention, the information elements on a screen may be shown as planar elements in a still screen for greater legibility, but when the information elements are in motion, such as for changing the screen or moving a content element, the motion is provided with differing speeds according to depth, thereby providing a sense of spatial perception unique to 3-dimensional images.

7 Claims, 17 Drawing Sheets

METHOD AND RECORDED MEDIUM FOR PROVIDING 3D INFORMATION SERVICE

CROSS-REFERENCE TO RELATED APPLICATIONS

This application claims the benefit of Korean Patent Application No. 10-2012-0012862, filed with the Korean Intellectual Property Office on Feb. 8, 2012, and Korean Patent Application No. 10-2011-0145903, filed with the Korean Intellectual Property Office on Dec. 29, 2011, the disclosures of which are incorporated herein by reference in their entirety.

BACKGROUND

1. Technical Field

The embodiments of the invention relate to a method and recorded medium for providing a 3D information service, more particularly to a method and recorded medium for providing a 3D information service with increased legibility of the information and increased depth perception.

2. Description of the Related Art

Conventional 3D UX (user experience) technology includes planar 3D technology and solid 3D technology.

Planar 3D technology involves representing a screen element as a planar element and moving it 3-dimensionally, comparable to moving a surface of a cube or a polyhedron. The user may experience the sensation of seeing a flat surface move 3-dimensionally. A drawback of planar 3D technology, however, is that the sense of spatial and 3-dimensional perception obtained through actual human eyes is not easily recreated on a TV screen. It is difficult to clearly provide a 3D effect simply by distorting images such as posters, etc. This is because there is a limit to providing perspective and depth perception for each object with planar 3D.

Solid 3D technology involves representing all screen elements freely in any shape and form in 3D space. While various forms such as cylindrical and radial forms, etc., are possible, there may be considerable distortion of the image. Such distortion may lower the legibility of the screen elements.

SUMMARY

An aspect of the invention is to provide a method and recorded medium for providing a 3D information service with increased legibility of the information elements and increased depth perception.

One aspect of the invention provides a method of providing a 3D information service at a user terminal. The method includes: receiving a first request of a user for displaying information; and displaying information elements, which have different depths along the Z axis orthogonal to a screen (XY plane), by rotating the information elements about any one of the X axis and the Y axis, where the rotational axis of each of the information elements is set at different points on the YZ plane or the XZ plane.

Each of the information elements can have a priority level, and the displaying can include displaying the information elements sequentially in accordance with the priority levels.

Any one of a depth, rotation speed, and rotation time point for each of the information elements can be different in accordance with a preset priority level.

The depth can be set smaller and the rotation speed and rotation time point can be set quicker for higher priority levels.

The method can further include: receiving a second request of a user; and removing the displayed information elements by rotating about any one of the X axis or the Y axis.

The rotation speed and rotation time point can be set slower for higher priority levels.

Another aspect of the invention provides a method of providing 3D information elements at a server connected by a network with a user terminal. The method includes: providing different depths for information elements displayed on a single screen in accordance with priority levels; and transmitting the information elements and rotation-related information of the information elements to the user terminal. The user terminal, upon receiving a first request of a user for displaying information, displays information elements, which have different depths along the Z axis orthogonal to a screen (XY plane), by rotating the information elements about any one of the X axis and the Y axis, and wherein the rotational axis of each of the information elements is set at different points on the YZ plane or the XZ plane.

Yet another aspect of the invention provides a recorded medium readable by a terminal, tangibly embodying a program of instructions executable by the terminal to perform a method for displaying 3D information, where the method includes: receiving a first request of a user for displaying information; and displaying information elements, which have different depths along the Z axis orthogonal to a screen (XY plane), by rotating the information elements about any one of the X axis and the Y axis, the rotational axis of each of the information elements being set at different points on the YZ plane or the XZ plane.

According to certain embodiments of the invention, the information elements on a screen may be shown as planar elements in a still screen for greater legibility, but when the information elements are in motion, such as for changing the screen or moving a content element, the motion is provided with differing speeds according to depth, thereby providing a sense of spatial perception unique to 3-dimensional images.

Additional aspects and advantages of the present invention will be set forth in part in the description which follows, and in part will be obvious from the description, or may be learned by practice of the invention.

DETAILED DESCRIPTION

Figure 1:
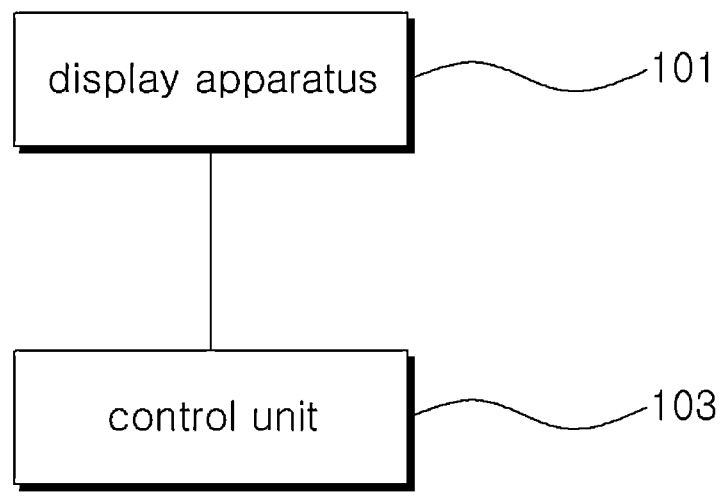
FIG. 1 illustrates an example of a 3D information display system according to an embodiment of the invention.

As the present invention allows for various changes and numerous embodiments, particular embodiments will be illustrated in the drawings and described in detail in the written description. However, this is not intended to limit the invention to particular modes of practice, and it is to be appreciated that all changes, equivalents, and substitutes that do not depart from the spirit and technical scope of the invention are encompassed in the present invention. In describing the drawings, like reference numerals are used for like elements.

Certain embodiments of the invention will be described below in more detail with reference to accompanying drawings.

FIG. 1 illustrates an example of a 3D information display system according to an embodiment of the invention.

As illustrated in FIG. 1, the display system can include a display apparatus 101 and a control unit 103.

The display apparatus 101 can be a display apparatus capable of displaying image information. This includes any apparatus that can display an image, such as a cell phone, smart phone, TV set, monitor screen, etc.

The control unit 103 can control the information elements displayed on the display apparatus such that the information elements can be recognized by the user with a 3-dimensional effect.

Figure 2:
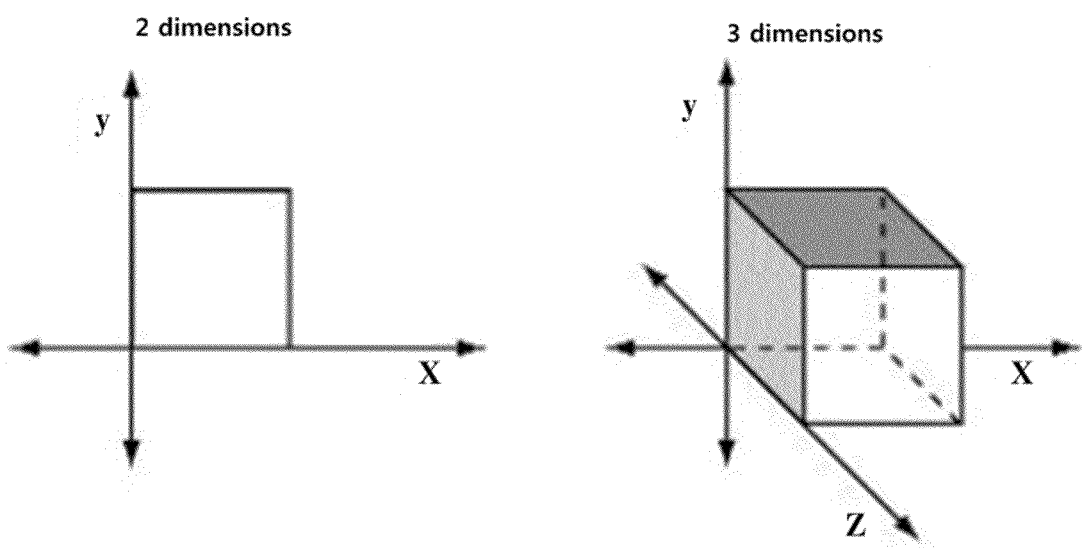
FIG. 2 is a diagram for describing the concept of 3 dimensions.

FIG. 2 is a diagram for describing the concept of 3 dimensions.

Referring to FIG. 2, a 2-dimensional information element provided to the user may include X axis and Y axis coordinates, while a 3-dimensional information element may include X axis, Y axis, and Z axis coordinates. Here, the X axis and Y axis represent planar coordinates for an information element displayed on the display apparatus 101, while the Z axis represents the direction orthogonal to the screen.

According to an embodiment of the invention, the information elements displayed on a single screen can have different depths along the Z axis, and the control unit 103 can rotate the displayed information elements about the X axis or Y axis to sequentially show or remove the information elements on or from the XY plane. That is, when a user's request to display information (first request) is inputted, the information elements can be rotated to be displayed, and when a user's second request (request to return to the previous menu or some other type of menu request) is inputted, the information elements can be rotated to disappear from the screen.

Here, priority levels are defined as levels indicating priority in terms of exposure to the user. For example, if the information elements to be displayed include dates, content titles, and genres, the content titles can be given the highest priority level, and accordingly, the content titles can be given the smallest depth.

Also, according to an embodiment of the invention, the priority levels can be used as information that defines the rotation speed (angular speed) of the information elements.

That is, if the control unit 103 is configured to rotate the information elements that are to be displayed, the rotation speed or the time point for starting rotation can be preset according to priority level for each information element. For example, the information element having a higher priority level can be set to have a faster rotation speed or be set to rotate earlier, so that the control unit 103 can provide the control to expose the information elements having the highest priority levels first on the XY plane during the process of sequentially displaying the information elements.

Figure 3:
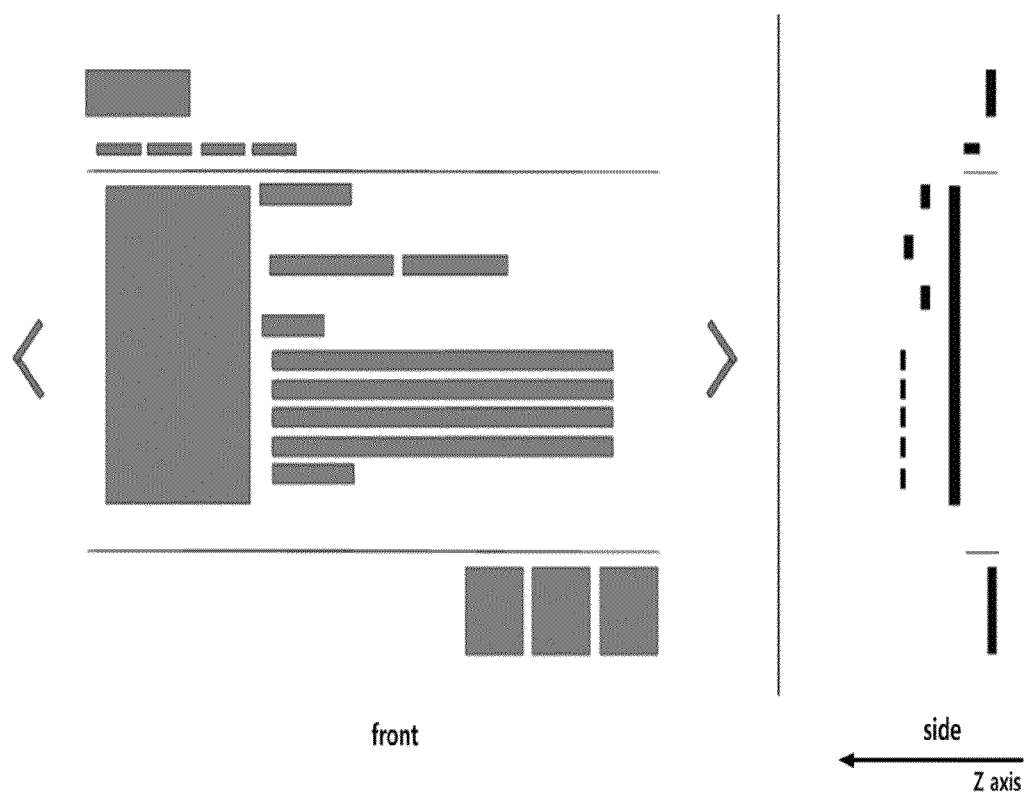
FIG. 3 illustrates a sample image of a 3D information element according to an embodiment of the invention.

FIG. 3 illustrates a sample image of a 3D information element according to an embodiment of the invention, as seen from the front and from the side.

Referring to FIG. 3, when seen from the front, the information elements included in a sample image can be seen as planar elements, but when seen from the side, each of the information elements are arranged with a different depth along the Z axis. A position further along the direction of the arrow of the Z axis represents a greater depth.

When the user sees the image from the front, the user can perceive only the information elements on the XY plane, and these are perceived as 2D information elements, providing the information elements with greater legibility for the user.

FIGS. 4A to 4E illustrate an example of rotating a user interface of 3D information elements about the X axis.

Figure 4A:
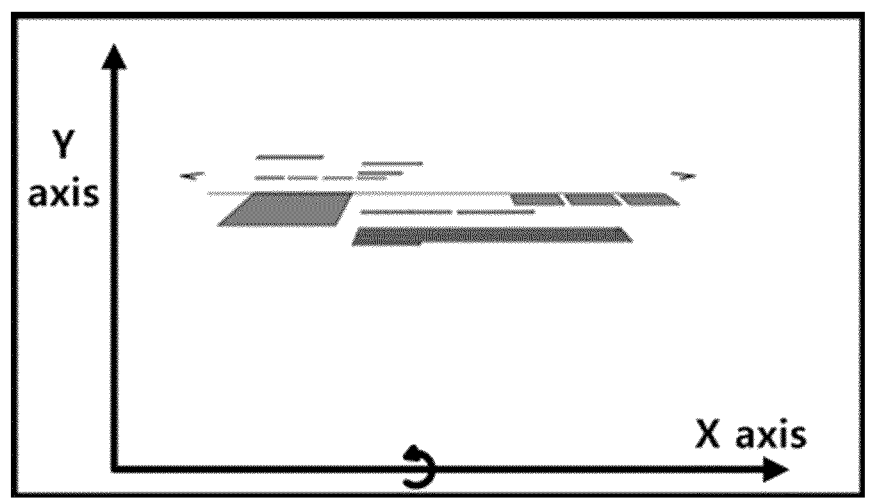
FIG. 4A, FIG. 4B, FIG. 4C, FIG. 4D, and FIG. 4E illustrate the sample image of a 3D information element as seen from the front and from the side.
Figure 4B:
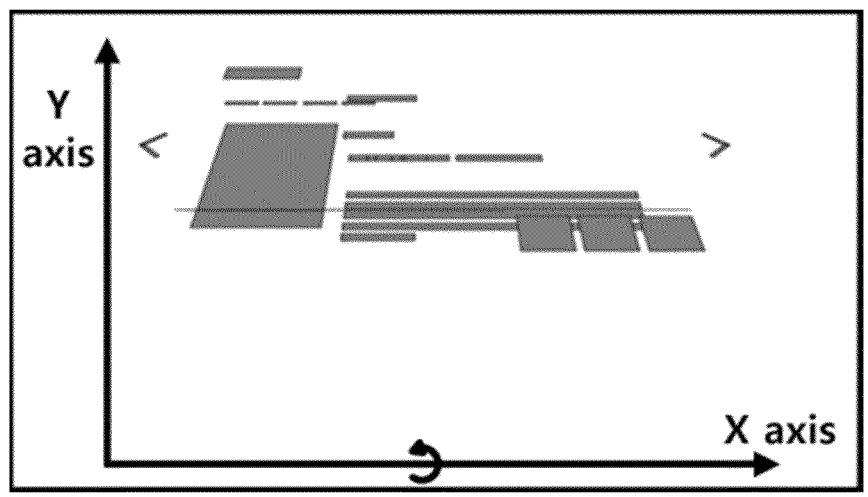
Figure 4C:
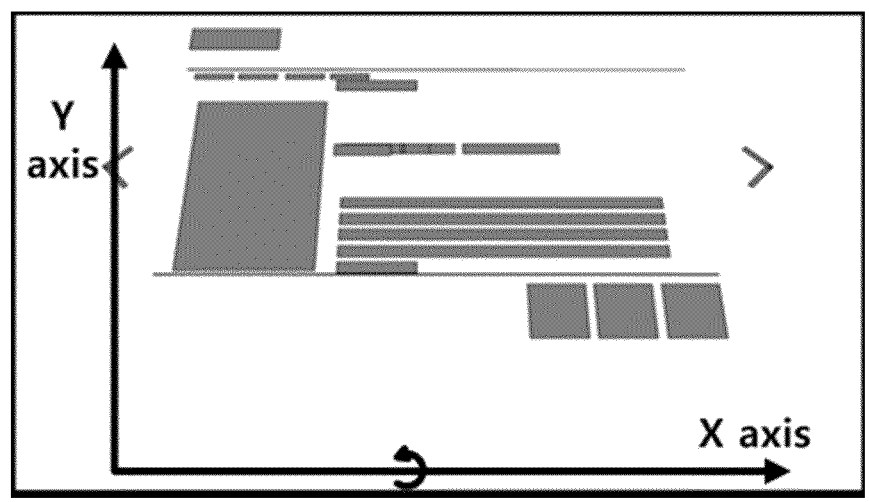
Figure 4D:

Referring to FIGS. 4A to 4E, when the screen output shown in FIG. 4D is required in accordance to the user's request, the control unit 103 may rotate each information element about the X axis.

As described above, each information element may have a different depth depending on priority level and can also have a different rotation time point or rotation speed.

Even when all of the information elements are rotated about the X axis as illustrated in FIGS. 4A to 4E, it may be necessary to prevent the information elements displayed on the screen from overlapping each other after the rotation of the information elements is completed.

Figure 4E:
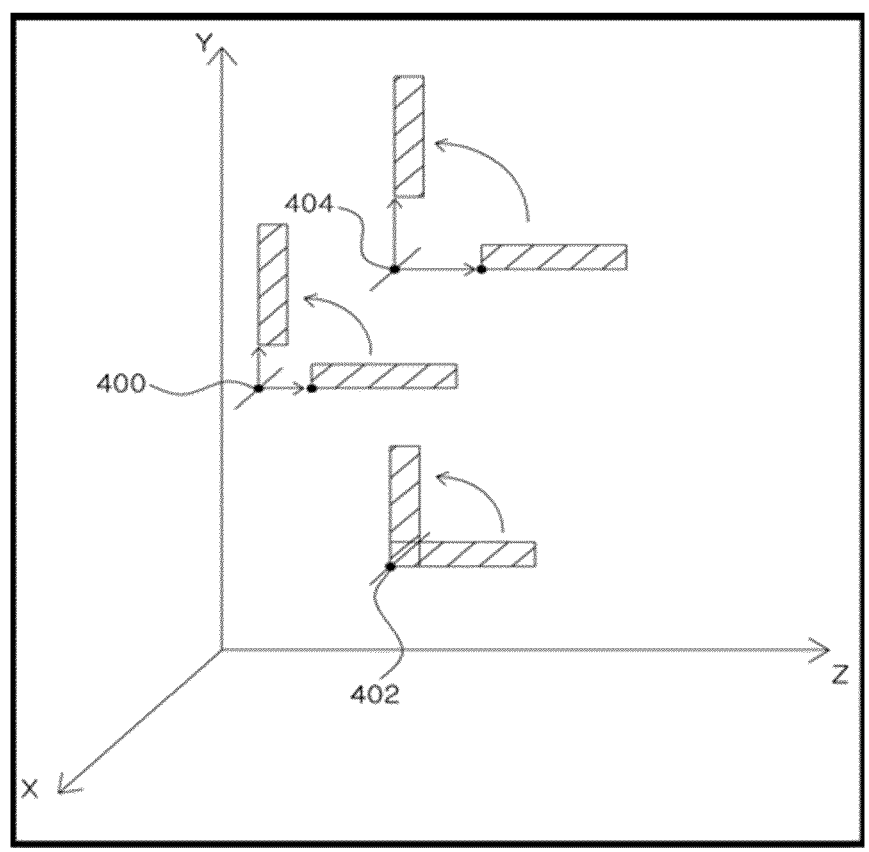

To this end, the rotational axes of the information elements in an embodiment of the invention can be set at different points (400 to 404) on the YZ plane, as shown in FIG. 4E. Also, each information element can be set to have a different radius of rotation.

If the information elements are to rotate about the X axis, then the rotation axes can be set at different points on the YZ plane, but if they are to rotate about the Y axis, then the rotation axes can be defined at different points on the XZ plane.

Figure 5:
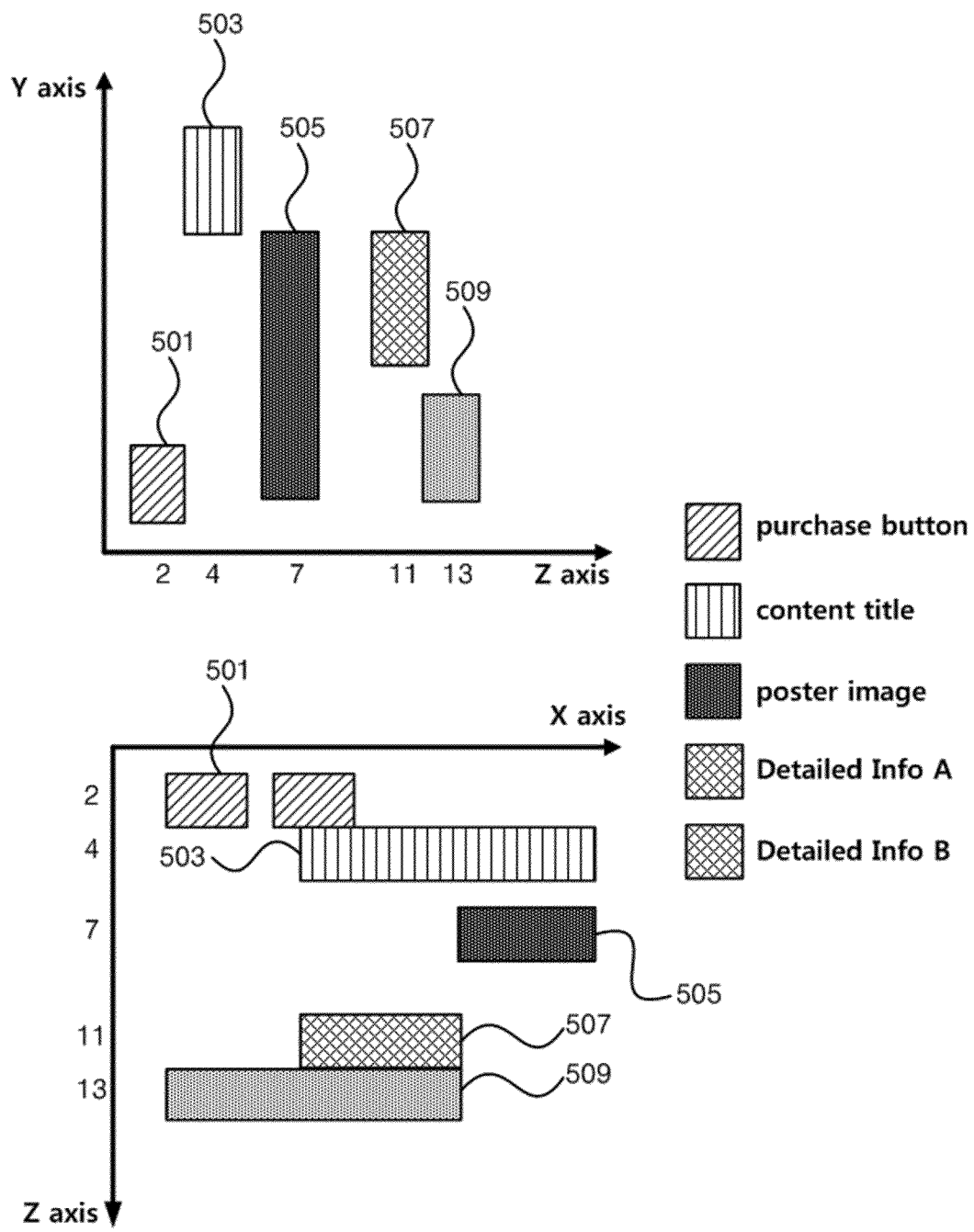
FIG. 5 illustrates an example of information elements having different depths.

FIG. 5 illustrates an example of information elements having different depths.

Referring to FIG. 5, the information elements that are to be displayed may include a purchase button 501, a content title 503, a poster image 505, Detailed Info A 507, and Detailed Info B 509.

The purchase button 501 can have a depth of 2 along the Z axis, the content title 503 can have a depth of 4 along the Z axis, the poster image 505 can have a depth of 7 along the Z axis, Detailed Info A 507 can have a depth of 11 along the Z axis, and Detailed Info B 509 can have a depth of 13 along the Z axis.

Also, each information element can be given a different rotation time point or a different rotation speed.

Also, the control unit 103 can provide the control to sequentially display each information element on the screen by rotating the information elements according to the depth and rotation time point or rotation speed of each information element.

Advantageously, the control unit 103 can provide the control to rotate the information elements not only about the X axis but also about the Y axis for left or right rotation.

Thus, as the purchase button 501 is rotated with precedence about a particular axis, the content title 503, poster image 505, Detailed Info A 507, and Detailed Info B 509 can rotate about the axis sequentially. In this case, the point at which each information element is perceived by the user can vary according to the preset rotation speed or rotation time point, whereby the information elements can be perceived by the user as 3-dimensional information elements.

Figure 6A:
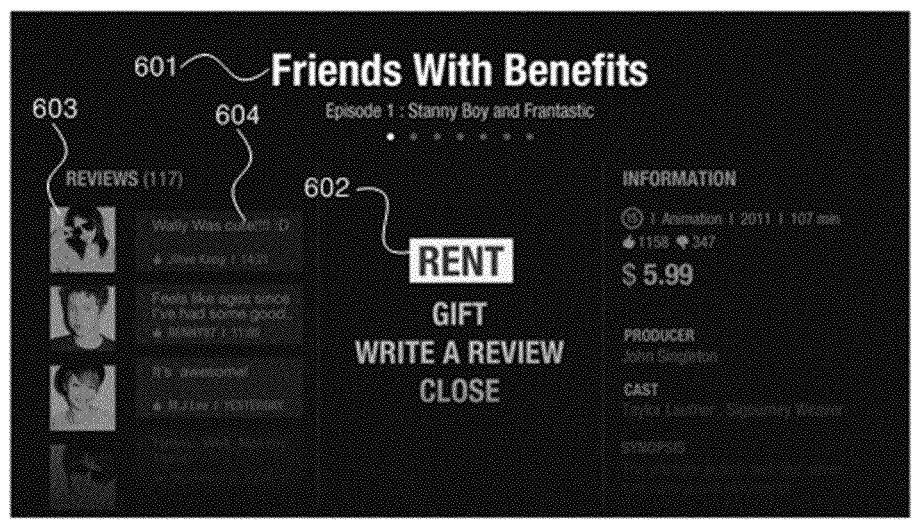
FIG. 6A and FIG. 6B illustrate an example of rotating information elements about the Y axis in accordance with priority levels, according to an embodiment of the invention.
Figure 6B:
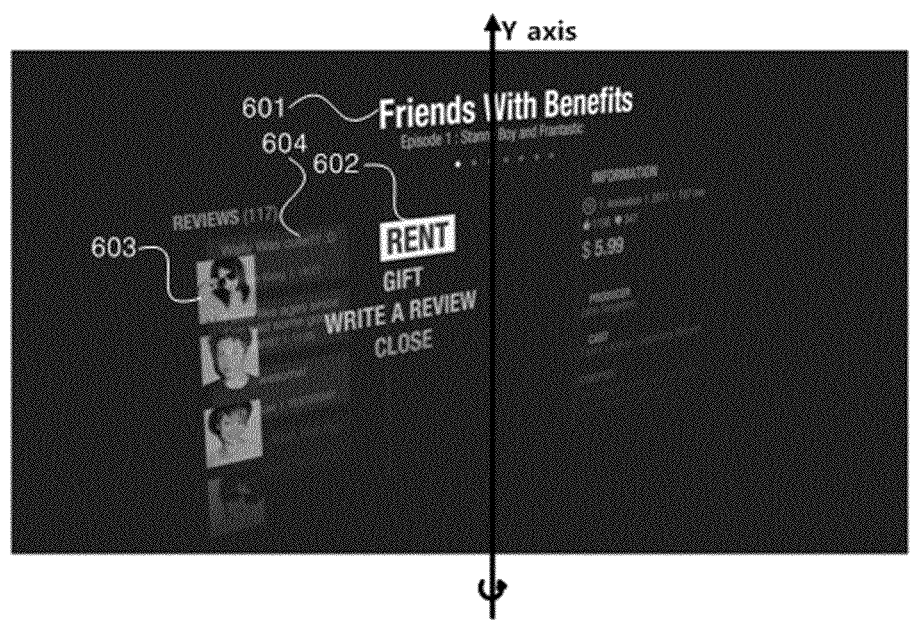
Figure 7A:
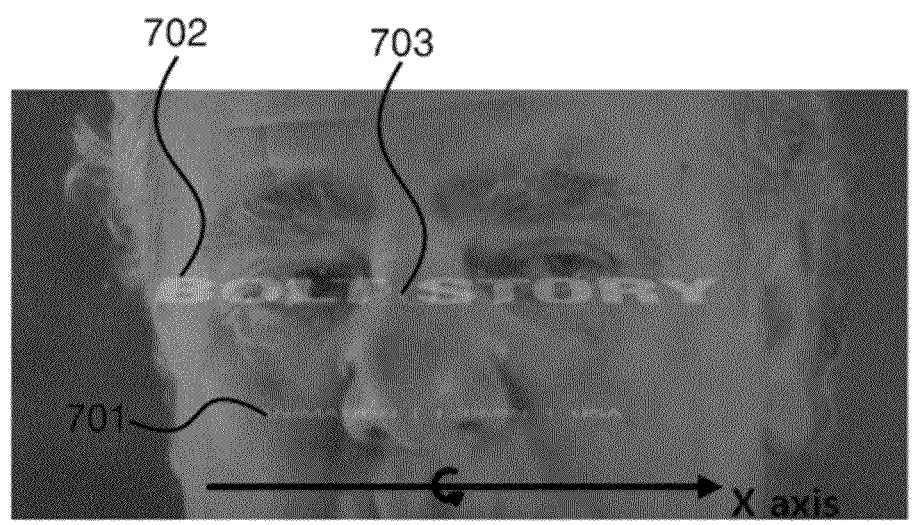
FIG. 7A, FIG. 7B, FIG. 7C, and FIG. 7D illustrate an example of rotating information elements about the X axis in accordance with priority levels, according to an embodiment of the invention.
Figure 7B:
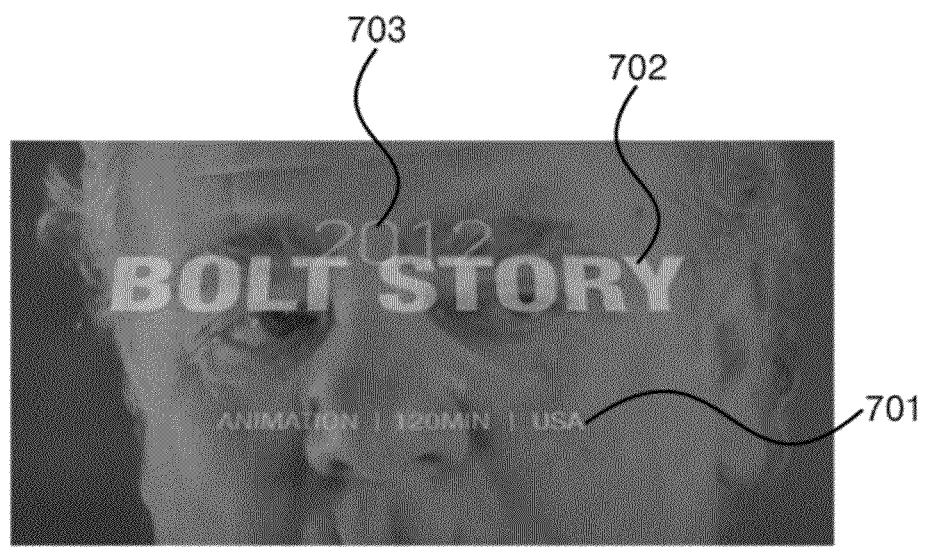
Figure 7C:
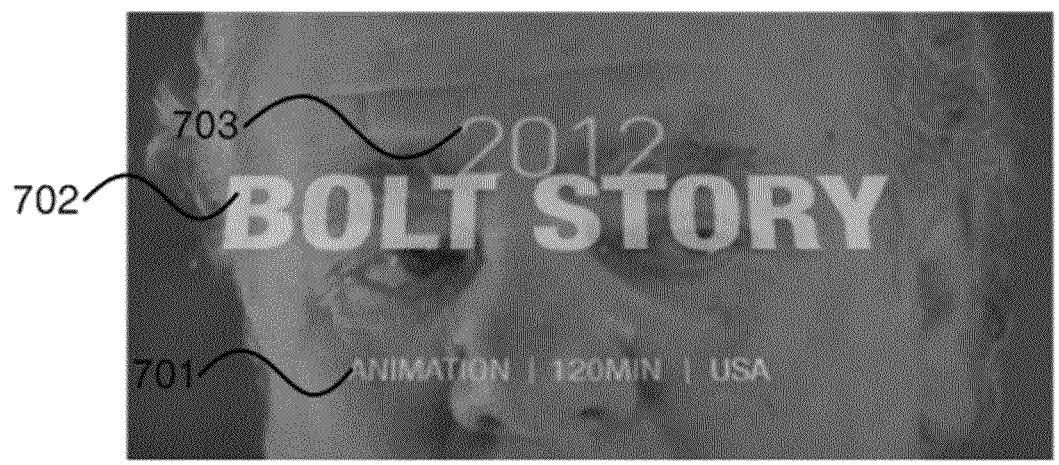
Figure 7D:
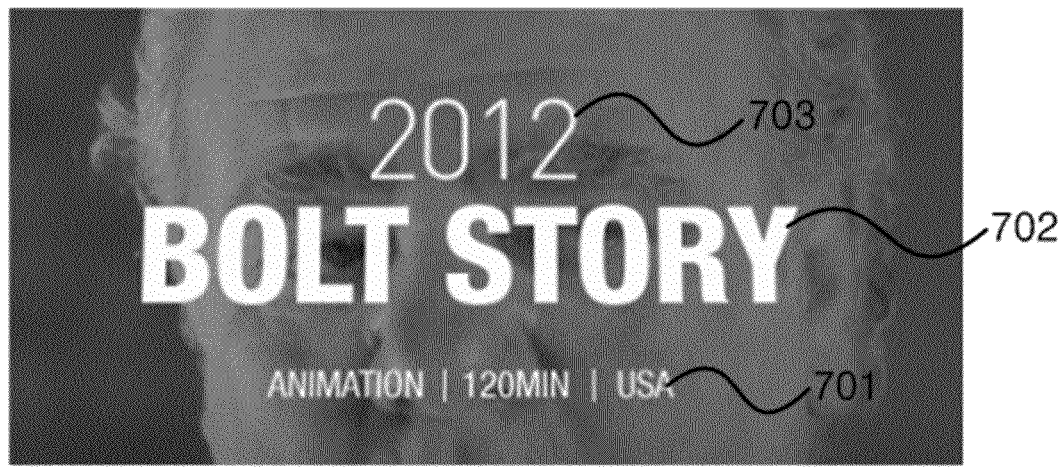

FIG. 6A and FIG. 6B illustrate an example of rotating information elements about the Y axis in accordance with priority levels, according to an embodiment of the invention.

In FIGS. 6A and 6B, the information elements have greater depths in the order of the first information element 601, the second information element 602, the third information element 603, and the fourth information element 604.

FIG. 6A illustrates the information elements when seen from the front, and FIG. 6B illustrates the information elements as they rotate about the Y axis.

Referring to FIG. 6B, each information element has a rotational axis at a different point, so that each of the information elements may be perceived as rotating independently, and in order to greater magnify the 3-dimensional effect, the first information element 601, second information element 602, third information element 603, and fourth information element 604 can be rotated at different speeds.

FIG. 6B illustrates the case where the information elements are removed, and according to an embodiment of the invention, the rotation speed and rotation time point depending on priority level here can be set differently from the case where the information elements are exposed.

That is, when the information elements are rotated and exposed, the rotation speeds and rotation time points can be set to be quicker for information elements having higher priority levels, and conversely, when the information elements are removed, the rotation speeds and rotation time points can be set to be slower for information elements having higher priority levels.

In this way, information elements of higher levels of importance can be shown first or removed later.

FIG. 7A, FIG. 7B, FIG. 7C, and FIG. 7D illustrate an example of rotating information elements about the X axis in accordance with priority levels, according to an embodiment of the invention.

In FIGS. 7A to 7D, the information elements have greater depths in the order of the first information element 701, the second information element 702, the third information element 703, and the fourth information element 704.

Referring to FIGS. 7A to 7D, each information element has a different depth and different radius of rotation, so that if the information elements are rotated at the same speed, the resulting effect is that the information elements arrive sequentially according to depth, providing the user with the sensation of the information elements appearing 3-dimensionally.

As described above, an embodiment of the invention can provide greater legibility, as the information elements are shown as planar elements in a still screen, and can also effectively provide a sense of spatial perception unique to 3D images, as the information elements composing the screen move at different speeds according to their respective depths during motion such as for changing the screen or moving a content element.

Figure 8:
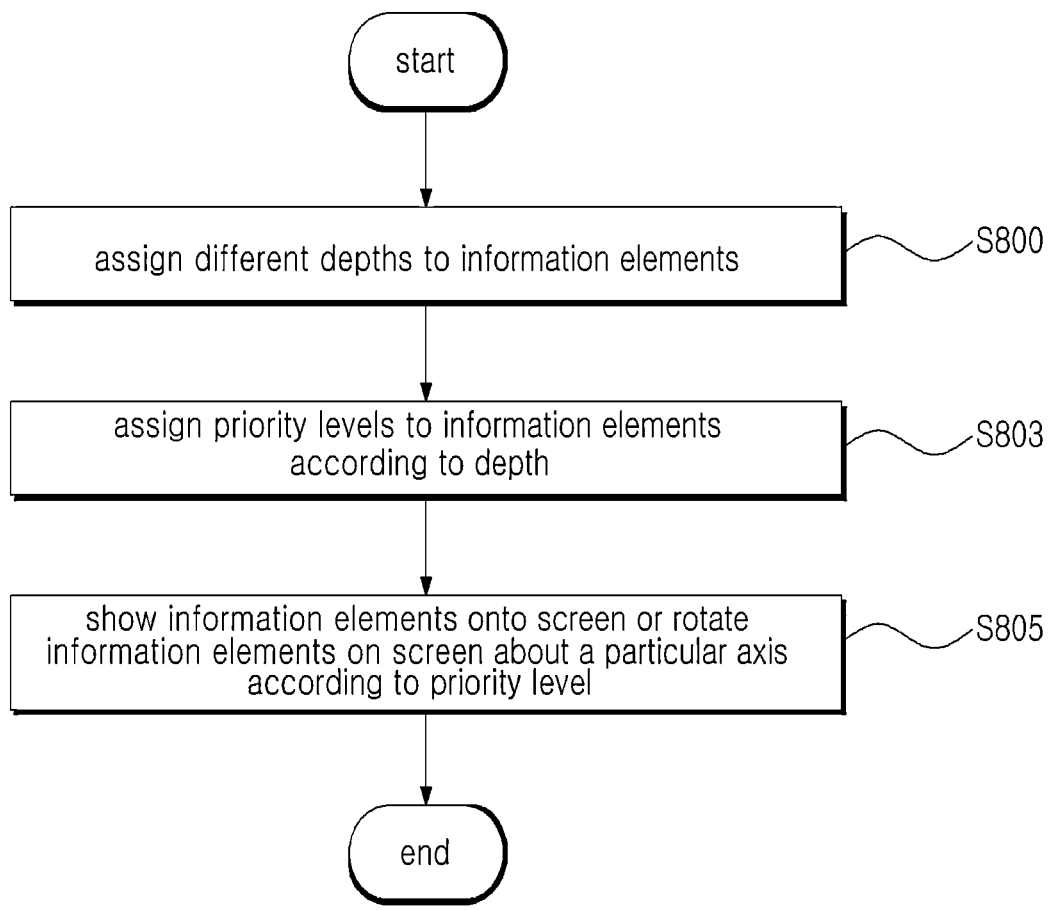
FIG. 8 is a flowchart illustrating the overall flow of a method for displaying 3D information elements according to an embodiment of the invention.

FIG. 8 is a flowchart illustrating the overall flow of a method for displaying 3D information elements according to an embodiment of the invention.

The procedure performed in each operation will be described below in more detail with reference to FIG. 8.

In operation S800, the information elements to be displayed on the display apparatus 101 may be assigned different depths.

Then, in operation S803, the information elements may be assigned priority levels according to their respective depths. Assigning the priority levels can be performed in various ways by the control unit 103, depending on the 3-dimensional visual effect that is to be provided to the user. In operation S803, the assigning of priority levels can include assigning a rotation speed and rotation time point for each of the information elements.

In operation 805, the information elements can be shown sequentially on the screen according to priority level, or the information elements on the screen can be rotated about a particular axis.

Here, the control unit 103 can rotate the information elements about a particular axis at different speeds or at different time points according to priority level.

Figure 9:
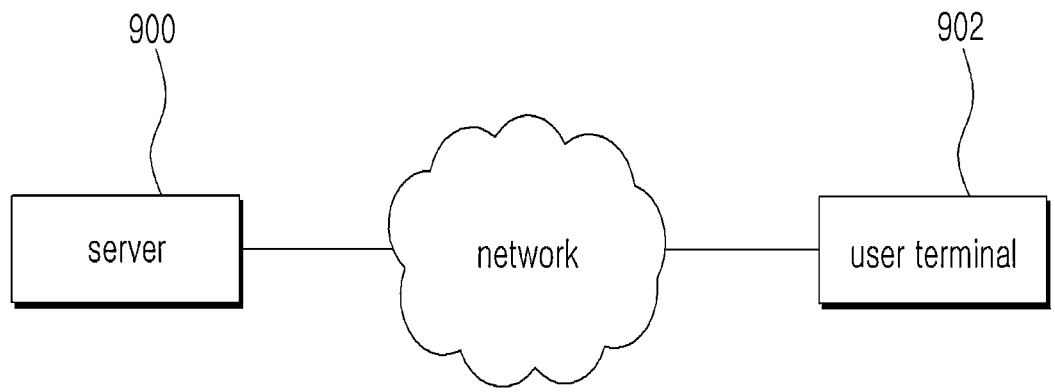
FIG. 9 is a diagram illustrating the composition of a system for providing a 3D information service according to an embodiment of the invention.

FIG. 9 is a diagram illustrating the composition of a system for providing a 3D information service according to an embodiment of the invention.

As illustrated in FIG. 9, a system for providing a 3D information service according to an embodiment of the invention can include a server 900 and a user terminal 902 connected with the server 900 over a network. The user terminal 902 may include a display apparatus 101 and a control unit 103, as described above with reference to FIG. 1, to display or remove information elements on the screen 3-dimensionally in response to a user's request.

Here, the user terminal 902 can be a TV set or a set-top box connected with a TV set, and in an embodiment of the invention, the information elements can be parts of a program guide by which a user is provided with a TV-related service.

The server 900 according to an embodiment of the invention can be a head end that provides broadcast services to the user terminal 902 and can perform the functions of transmitting programs upon the user's request, as well as providing program guide information.

According to an embodiment of the invention, the server 900 may assign different depths along the Z axis, which is orthogonal to the screen, for the information elements displayed on a single screen.

At the same time, the server 900 can set at least one of the rotation speed and the rotation time point differently according to the priority level of each information element.

Periodically, or upon request from the user terminal 902, the server 900 can transmit the information elements above as well as the information related to the rotation of the information elements.

Here, the information related to rotation can include information regarding the rotation speed and the rotation time point, as well as the depth information of each information element.

The user terminal 902 can show or remove the information elements displayed on a single screen by using the rotation-related information above to rotate the information elements.

The embodiments of the present invention can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. A method of providing a 3D information service at a user terminal, the method comprising:
    receiving a first request of a user for displaying information; and
    displaying information elements by individually rotating the information elements about any one of an X axis and a Y axis, the information elements having different depths along a Z axis orthogonal to a screen (XY plane), the information elements being sequentially displayed on the screen by rotating or the displayed information elements being sequentially removed from the screen by rotating, wherein
        a rotational axis of each of the information elements is set at different points on a YZ plane or an XZ plane,
        each of the information elements has a priority level and is rotated about any one of the X axis and the Y axis in accordance with the priority level,
        a depth, a rotation speed, and a rotation time point is different for each of the information elements in accordance with a preset priority level, and
        the rotation time point is a starting time of rotation.

2. The method of claim 1, wherein the displaying comprises displaying the information elements sequentially in accordance with the priority levels.

3. The method of claim 1, wherein the depth is set smaller and the rotation speed and the rotation time point are set quicker for higher priority levels.

4. The method of claim 1, further comprising:
    receiving a second request of a user; and
    removing the displayed information elements by rotating about any one of the X axis or the Y axis.

5. The method of claim 4, wherein the rotation speed and rotation time point are set slower for higher priority levels.

6. A method of providing 3D information elements at a server connected by a network with a user terminal, the method comprising:
    providing different depths for information elements displayed on a single screen in accordance with priority levels; and
    transmitting the information elements and rotation-related information of the information elements to the user terminal, wherein
        the user terminal, upon receiving a first request of a user for displaying information, displays information elements having different depths along a Z axis orthogonal to a screen (XY plane) by individually rotating the information elements about any one of an X axis and a Y axis, the information elements being sequentially displayed on the screen by rotating or the displayed information elements being sequentially removed from the screen by rotating, and wherein a rotational axis of each of the information elements is set at different points on a YZ plane or an XZ plane,
        each of the information elements has a priority level and is rotated about any one of the X axis and the Y axis in accordance with the priority level,
        a depth, a rotation speed, and a rotation time point is different for each of the information elements in accordance with a preset priority level, and
        the rotation time point is a starting time of rotation.

7. A non-transitory recorded medium readable by a terminal, tangibly embodying a program of instructions executable by the terminal to perform a method for displaying 3D information, the method comprising:
    receiving a first request of a user for displaying information; and
    displaying information elements by individually rotating the information elements about any one of an X axis and a Y axis, the information elements having different depths along a Z axis orthogonal to a screen (XY plane), the information elements being sequentially displayed on the screen by rotating or the displayed information elements being sequentially removed from the screen by rotating, wherein
        a rotational axis of each of the information elements is set at different points on a YZ plane or an XZ plane,
        each of the information elements has a priority level and is rotated about any one of the X axis and the Y axis in accordance with the priority level,
        a depth, a rotation speed, and a rotation time point is different for each of the information elements in accordance with a preset priority level, and
        the rotation time point is a starting time of rotation.

* * * * *